(12) United States Patent
Rasmussen et al.

(10) Patent No.: US 7,630,428 B2
(45) Date of Patent: Dec. 8, 2009

(54) FAST DIGITAL CARRIER FREQUENCY ERROR ESTIMATION ALGORITHM USING SYNCHRONIZATION SEQUENCE

(75) Inventors: Donald John Rasmussen, Fort Wayne, IN (US); Gregory Thomas Barnett, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 720 days.

(21) Appl. No.: 11/314,122

(22) Filed: Dec. 21, 2005

(65) Prior Publication Data

US 2007/0025476 A1 Feb. 1, 2007

Related U.S. Application Data

(60) Provisional application No. 60/703,180, filed on Jul. 28, 2005.

(51) Int. Cl.
*H04B 1/00* (2006.01)
(52) U.S. Cl. .................................. 375/149; 375/145
(58) Field of Classification Search ................. 375/130, 375/145, 149, 343–344, 367, 371
See application file for complete search history.

(56) References Cited

U.S. PATENT DOCUMENTS

| | | | |
|---|---|---|---|
| 3,938,045 A | 2/1976 | Mathwich | |
| 4,057,759 A | 11/1977 | Genova et al. | |
| 4,466,108 A * | 8/1984 | Rhodes | 375/329 |
| 4,516,087 A | 5/1985 | Bruene | |
| 4,527,278 A * | 7/1985 | Deconche et al. | 375/344 |
| 4,612,365 A * | 9/1986 | Birr et al. | 530/301 |
| 5,157,693 A | 10/1992 | Lemersal, Jr. et al. | |
| 5,177,765 A | 1/1993 | Holland et al. | |
| 5,195,108 A | 3/1993 | Baum et al. | |
| 5,579,338 A | 11/1996 | Kojima | |
| 5,692,014 A * | 11/1997 | Basham et al. | 375/326 |
| 5,732,106 A | 3/1998 | Rasmussen et al. | |
| 5,818,867 A | 10/1998 | Rasmussen et al. | |
| 6,002,710 A | 12/1999 | Hendrickson et al. | |
| 6,674,790 B1 | 1/2004 | Rasmussen et al. | |

(Continued)

FOREIGN PATENT DOCUMENTS

EP  1 191 704 A2  3/2002

(Continued)

OTHER PUBLICATIONS

International Search Report Application No. PCT/US2006/029192 dated Dec. 15, 2006.

(Continued)

*Primary Examiner*—Jean B Corrielus
(74) *Attorney, Agent, or Firm*—RatnerPrestia

(57) ABSTRACT

Methods and apparatus for determining carrier frequency error of a serial offset quadrature pulse shaped signal, such as a minimum shift keyed (MSK) signal, are disclosed. Carrier frequency error is determined by receiving a quadrature pulse shaped signal having a synchronization sequence, detecting synchronization of the quadrature pulse shaped signal, and storing a baseband inphase (I) signal and a baseband quadrature (Q) signal of the synchronization sequence while detecting synchronization. After detecting synchronization, segments of the stored baseband I and Q signals are read and correlated with a spreading sequence. Carrier frequency error is then estimated based on phase differences between each of the correlated segments.

26 Claims, 12 Drawing Sheets

U.S. PATENT DOCUMENTS

| | | | |
|---|---|---|---|
| 6,859,463 B1 | 2/2005 | Mayor et al. | |
| 7,149,266 B1 * | 12/2006 | Imamura et al. | 375/355 |
| 7,443,938 B2 * | 10/2008 | Varikat et al. | 375/354 |
| 2006/0008035 A1 * | 1/2006 | Larsson | 375/343 |

FOREIGN PATENT DOCUMENTS

| | | |
|---|---|---|
| GB | 2 359 456 A | 8/2001 |

OTHER PUBLICATIONS

Carl Andren, "Short PN Sequences for Direct Sequences Spread Spectrum Radios", Apr. 11, 1997, pp. 1-4.

John Fakatselis, "Processing Gain for Direct Sequence Spread Spectrum Communication Systems and Prism®", Intersil Corporation, 2000, pp. 1-4.

Chris Heegard et al., "High-Performance Wireless Ethernet", IEEE, Nov. 2001, pp. 64-73.

* cited by examiner

FAST DIGITAL CARRIER FREQUENCY ERROR ESTIMATION ALGORITHM USING SYNCHRONIZATION SEQUENCE

CROSS REFERENCE TO RELATED APPLICATIONS

This application claims priority of U.S. Provisional Patent Application Ser. No. 60/703,180, filed Jul. 28, 2005.

STATEMENT REGARDING FEDERALLY SPONSORED RESEARCH

This invention was made with Government Support Under Agreement No. DAAB07-03-9-K601 awarded by the United States Army. The Government has certain rights in the invention.

TECHNICAL FIELD

The present invention relates, in general, to communication systems. More specifically, it relates to enhanced methods and apparatus for determining carrier frequency error in a receiver.

BACKGROUND OF THE INVENTION

Carrier frequency error estimation is often performed in a receiver of a communication system to eliminate offsets between a received signal's actual frequency and a frequency assumed by the receiver. An optimal maximum likelihood estimator (MLE) for the offset is given by the location of the peak of a spectral plot for the signal. Used with a discrete Fourier transform (DFT), the MLE has been shown to achieve the Cramer-Rao lower bound on variance at high signal-to-noise ratios (SNR).

A phase-locked loop (PLL) may be used for carrier phase tracking. Additionally, two cascaded PLLs may be used to form a carrier frequency error estimate. Phase estimates of a first PLL "converge" to a line whose slope is proportional to the offset between the actual and assumed carrier frequencies of the received signal, while phase estimates of the second PLL converge to a constant value corresponding to the phase offset.

Other carrier frequency error estimation methods involve the processing of de-spread data samples, e.g., algorithms devised for high capacity data radio (HCDR) narrowband mode. In HCDR, the complex conjugate of a known training sequence is multiplied by received de-spread data samples to generate an error signal. This removes the data modulation while leaving information about the frequency offset. The complex error signal is then rotated to produce samples of a complex exponential that, if plotted, would be centered about the real axis. This method then forms an estimate of the carrier frequency error by calculating the slope of the resulting line divided by an estimate of the signal amplitude.

In a relatively simpler approach, the frequency estimate of a complex sinusoid x(k) in complex white Gaussian noise is calculated according to equation 1:

$$\Delta\omega = \sum_{k=1}^{N-1} w_k \arg[x*(k)x(k+1)], \quad (1)$$

where N is the number of symbols and $W_k$ is a weighting function given by equation 2:

$$w_k = \frac{6k(N-k)}{N(N^2-1)}. \quad (2)$$

This well-known approach was developed by Steven M. Kay and is referred to as "Kay's approach." In Kay's approach, the frequency is estimated using the weighted average of N−1 differential phase values, which are calculated as the arctangent of the product of the complex signal's conjugate and a time-shifted version of itself. This method has also been shown to achieve the Cramer-Rao lower bound for high SNR levels due to the properties of the weighting function.

Digital carrier frequency error estimation using the DFT approach described above may be too costly computationally for certain applications even if a fast Fourier transform (FFT) is used. Similarly, the PLL approach entails additional hardware and processing complexity that make this method undesirable compared to simpler algorithms. A limitation of the HCDR approach is the appearance of a bias error in the carrier frequency error estimate that increases with the degree of the offset and is independent of the symbol energy to noise energy (Es/No) level. The addition of a compensation factor may reduce the mean estimation error, however, this results in increased complexity along with an increase in the variance of the estimation error. With respect to Kay's approach, direct application to a Quasi-Bandwidth Limited Minimum Shift Keyed (QBL-MSK) modulated waveform illustrates that adequate performance requires a relatively large number of symbols. Accordingly, improved carrier frequency error estimation methods and apparatus are needed that are not subject to these limitations. The present invention addresses this need among others.

SUMMARY OF THE INVENTION

The present invention is embodied in methods and apparatus for determining carrier frequency error of a serial offset quadrature pulse shaped signal, such as a minimum shift keyed (MSK) signal. Carrier frequency error is determined by receiving a quadrature pulse shaped signal having a synchronization sequence, detecting synchronization of the quadrature pulse shaped signal, and storing a baseband inphase (I) signal and a baseband quadrature (Q) signal of the synchronization sequence while detecting synchronization. After detecting synchronization, segments of the stored baseband I and Q signals are read and correlated with a spreading sequence. Carrier frequency error is then estimated based on phase differences between each of the correlated segments.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. This emphasizes that according to common practice, the various features of the drawings are not drawn to scale. On the contrary, the dimensions of the various features are arbitrarily expanded or reduced for clarity. Included in the drawings are the following figures.

DETAILED DESCRIPTION OF THE INVENTION

Figure 1:
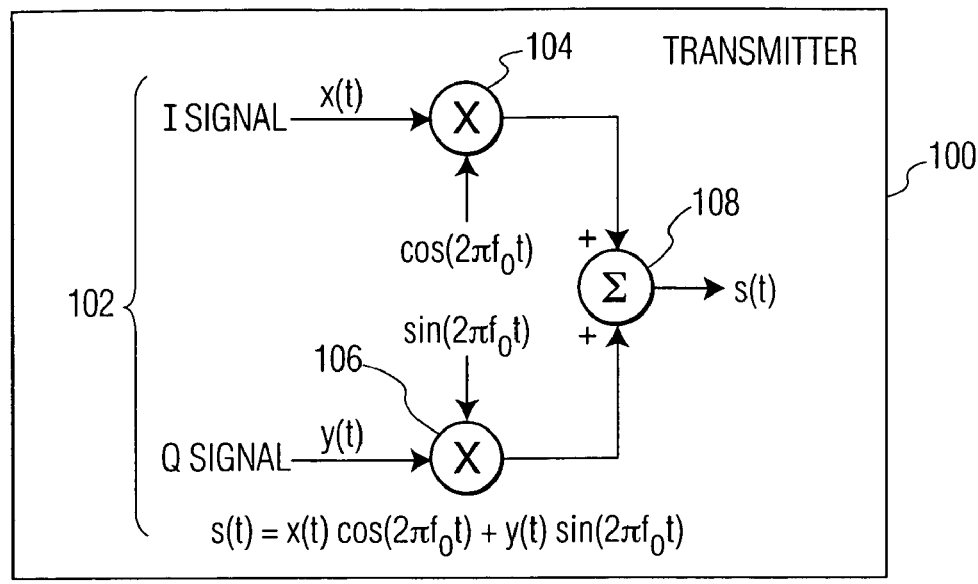
FIG. 1 is a block diagram of an SQBL-MSK module of a transmitter in accordance with an embodiment of the present invention.

In accordance with one aspect of the invention, an improved digital frequency estimation algorithm is provided that overcomes the complexity of DFT algorithms and the additional overhead associated with PLL approaches by "back processing" the synchronization section of a received waveform. The algorithm allows for a frequency estimate to be formed from a relatively short segment of input data using overlapping symbols extracted from the data. By correlating over short segments, the signal-to-noise ratio is improved for the estimate. Since a synchronization (SYNC) sequence is known by a demodulator in a receiver, the demodulator can store the received digitized inphase (I) and quadrature (Q) baseband signals during the SYNC section of the waveform. Once SYNC is detected, the stored I and Q signals received during the SYNC section are read out of memory and processed to determine the carrier frequency error. The carrier frequency error can be determined entirely in the time-domain. Thus, a Fourier transform is not required, thereby avoiding the associated computational complexity. The carrier frequency error may be passed to the demodulator to provide a carrier frequency correction.

A carrier frequency estimate is formed in accordance with the present invention using a weighted average of differential phase measurements. The differential phase is calculated between overlapping, de-spread symbols extracted from a synchronization section of a waveform. The frequency estimate, $f_{est}$, is given in Hz by equation 3:

$$f_{est} = \frac{1}{2\pi T_{offset}} \sum_{k=0}^{N-1} w_k \Delta\theta_k, \quad (3)$$

where $T_{offset}$ is the time offset between successive symbols, N is the number of symbols, $w_k$ is a weighting function and $\Delta\theta_k$ is the phase difference between symbols.

In an exemplary embodiment, the algorithm is applied to serial formatted Quasi-Bandwidth Limited Minimum Shift Keyed (QBL-MSK) modulation, which is a power spectral efficient signal with a near constant radio frequency (RF) envelope modulation. Serial QBL-MSK (SQBL-MSK) enables use of a serial correlation structure, which requires only an inphase (I) correlator and a quadrature (Q) correlator using the same synchronization (SYNC) sequence. Standard parallel QBL-MSK uses a four correlator structure based on the even and odd symbols on the I and Q sequence. Using the serial correlation structure for synchronization (SYNC) detection and short segment correlations for frequency estimation provides a simplified Binary Phase Shift Keying (BPSK) correlation operation versus the parallel structure, which reduces complexity in the SYNC and frequency estimation operation. Although QBL-MSK is selected as the modulation waveform in the exemplary embodiment, other embodiments including constant or near constant envelope modulation like MSK, Gaussian MSK, Offset Quadrature Phase Shift Keying (OQPSK), Raised Cosine (RC)-OQPSK, and other such keying techniques can be used for the modulation.

In an exemplary embodiment, serial formatting is used on the waveforms during modulation to simplify the SYNC and frequency estimation operation. Serial formatting for quadrature pulse-shaped signals may be applied by adding a serial formatting term to the modulation waveform, which multiplies a non-return-to-zero (NRZ) symbol sequence with a repetitive 1, 1, −1, −1 sequence. For SQBL-MSK, the modulation waveform for the SYNC section of the waveform can be is written as shown in equation 4 and 5.

$$s(t) = \left[\sum_{i=0}^{M-1} (-1)^{-i} c_{2i} \cdot p(t - 2iT_s)\right] \cos(2\pi f_o t) + \left[\sum_{i=0}^{M-1} (-1)^i c_{2i+1} \cdot p(t - [2i+1]T_s)\right] \sin(2\pi f_o t) \quad (4)$$

where $$p(t) = \begin{cases} \left[\dfrac{\sin\left(\dfrac{\pi t}{2T_s}\right)}{\left(\dfrac{\pi t}{2T_s}\right)}\right]^3; & -2T_s \leq t \leq 2T_s \\ 0; & \text{elsewhere.} \end{cases} \quad (5)$$

For the SQBL-MSK SYNC waveform equations 4 and 5, Ts represents the SYNC symbol period, $c_i$ represents the SYNC symbols at time iTs, 2M is the number of symbols in the SYNC sequence, p(t) is the QBL pulse-shaping function, $f_o$ is the carrier center frequency, and the $(-1)^i$ terms, which multiply the symbol values, represents the serial formatting. For a 128 symbol SYNC, M is equal to 64 and the SYNC symbols ($c_i$) take on either a +1 or −1 value.

FIG. 1 shows a block diagram of a transmitter 100 including a SQBL-MSK modulator 102 that transmits the RF modulated signal s(t). As shown, the I and Q data signals are mixed with a carrier signal {cos(2πf₀t) and sin(2πf₀t), respectively} at mixers 104 and 106. The outputs from mixers 104 and 106 are then combined by a summer 108. The resulting signal is a RF modulated signal, s(t), represented by equation 5.1:

$$s(t)=x(t)\cos(2\pi f_o t)+y(t)\sin(2\pi f_o t). \tag{5.1}$$

The equations for the I {x(t)} and Q {y(t)} signals modulating the carriers during the SYNC section of the waveform may be obtained directly from equation 4 and are set forth below in equation 6 and equation 7, respectively:

$$x(t) = \left[\sum_{i=0}^{M-1} (-1)^i c_{2i} \cdot p(t-2iT_s)\right] \tag{6}$$

and $$y(t) = \left[\sum_{i=0}^{M-1} (-1)^i c_{2i+1} \cdot p(t-[2i+1]T_s)\right]. \tag{7}$$

Figure 2:
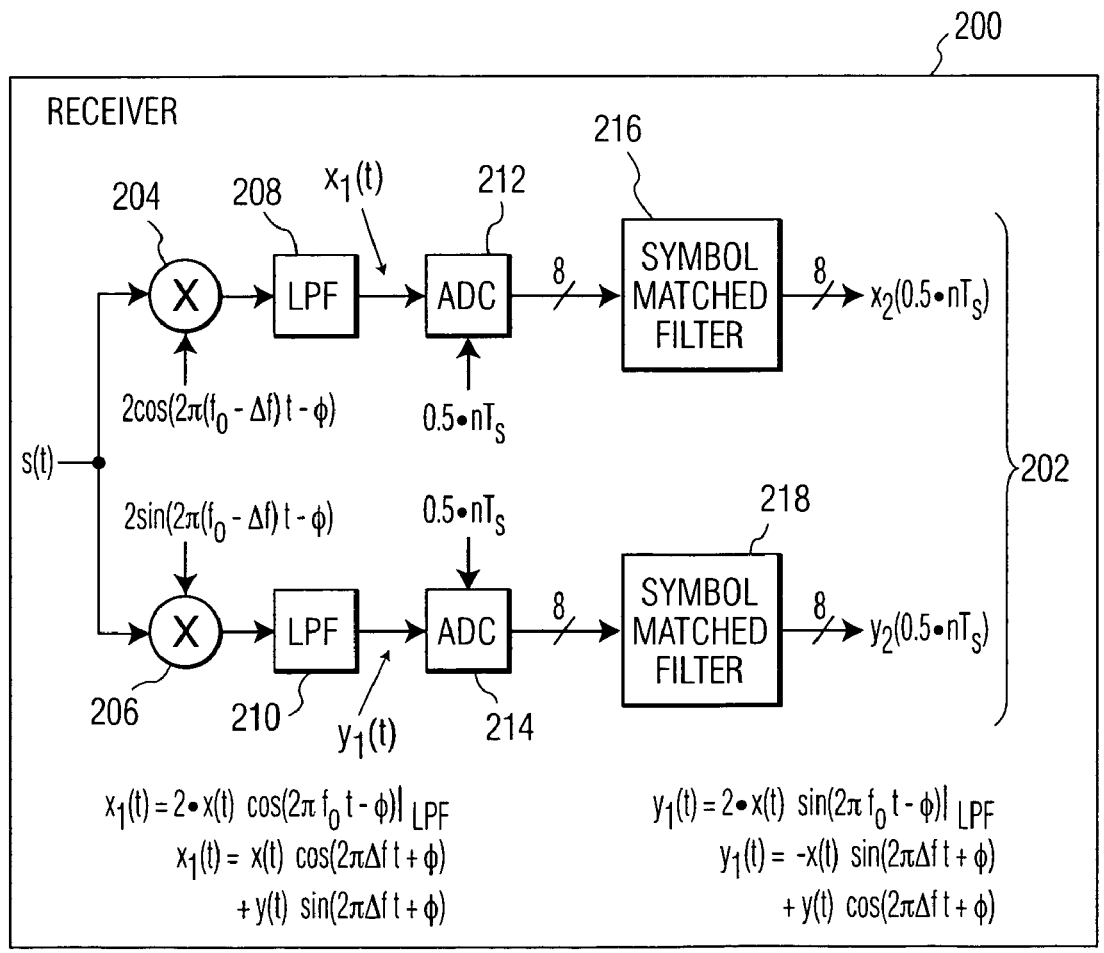
FIG. 2 is a block diagram of an SQBL-MSK demodulator front end of a receiver in accordance with an embodiment of the present invention.

FIG. 2 shows a block diagram of a receiver 200 including a SQBL-MSK demodulator front-end 202. The receiver 200 receives the baseband signal s(t). Demodulator front-end 202 down-converts the received signal to baseband I and Q signals, digitizes the I and Q signals, and digitally filters the I and Q signals. As shown, the received signal is mixed by mixers 204 and 206 with respective quadrature signals at the carrier frequency to down-convert the received signal, resulting in the desired baseband I and Q signals (mixing difference term) and the undesired signal at twice the carrier frequency (mixing sum term). Lowpass filtering by low pass filters (LPFs) 208 and 210 follows the down-conversion to remove the undesired mixing summation term. Baseband I and Q signals are then digitized by the I and Q analog-to-digital converters (ADC) 212 and 214. As shown in FIG. 2, the sampling rate is equal to twice the symbol rate. Following digitization, the I and Q signals are filtered, respectively, by symbol matched filters 216 and 218 to maximize signal-to-noise ratio (SNR). The I and Q symbol matched filter 216 and 218 are then sent to SYNC and carrier frequency estimation operations, which are described in detail below.

The QBL-MSK coefficients of the symbol matched filters 216 and 218 are based on the QBL-MSK pulse-shaping function shown in equation 8:

$$p(t) = \begin{cases} \left[\dfrac{\sin\left(\dfrac{\pi[t-2T_s]}{2T_s}\right)}{\left(\dfrac{\pi[t-2T_s]}{2T_s}\right)}\right]^3; & 0 \le t \le 4T_s \\ 0; & \text{elsewhere.} \end{cases} \tag{8}$$

where Ts corresponds to the symbol period for the SYNC sequence. Since, in accordance with equation 8, the QBL-MSK pulse-shaping function is non-zero over a four symbol period interval, the digital QBL-MSK symbol matched filters 216 and 218 operating at twice the symbol rate consist of 9 samples defined by equation 9:

$$p(k) = \left[\dfrac{\sin\left(\dfrac{\pi[0.5 \cdot k - 2]}{2}\right)}{\left(\dfrac{\pi[0.5 \cdot k - 2]}{2}\right)}\right]^3; \quad k = 0, 1, 2, 3, \ldots, 8. \tag{9}$$

Since the filter value is equal to zero for k equal to 0 and 8, the response of the digital QBL-MSK symbol matched filters 216 and 218 can be simplified to 7 samples defined by equation 10:

$$p(k) = \left[\dfrac{\sin\left(\dfrac{\pi[0.5 \cdot k - 1.5]}{2}\right)}{\left(\dfrac{\pi[0.5 \cdot k - 1.5]}{2}\right)}\right]^3; \quad k = 0, 1, 2, 3, \ldots, 6. \tag{10}$$

Figure 3:
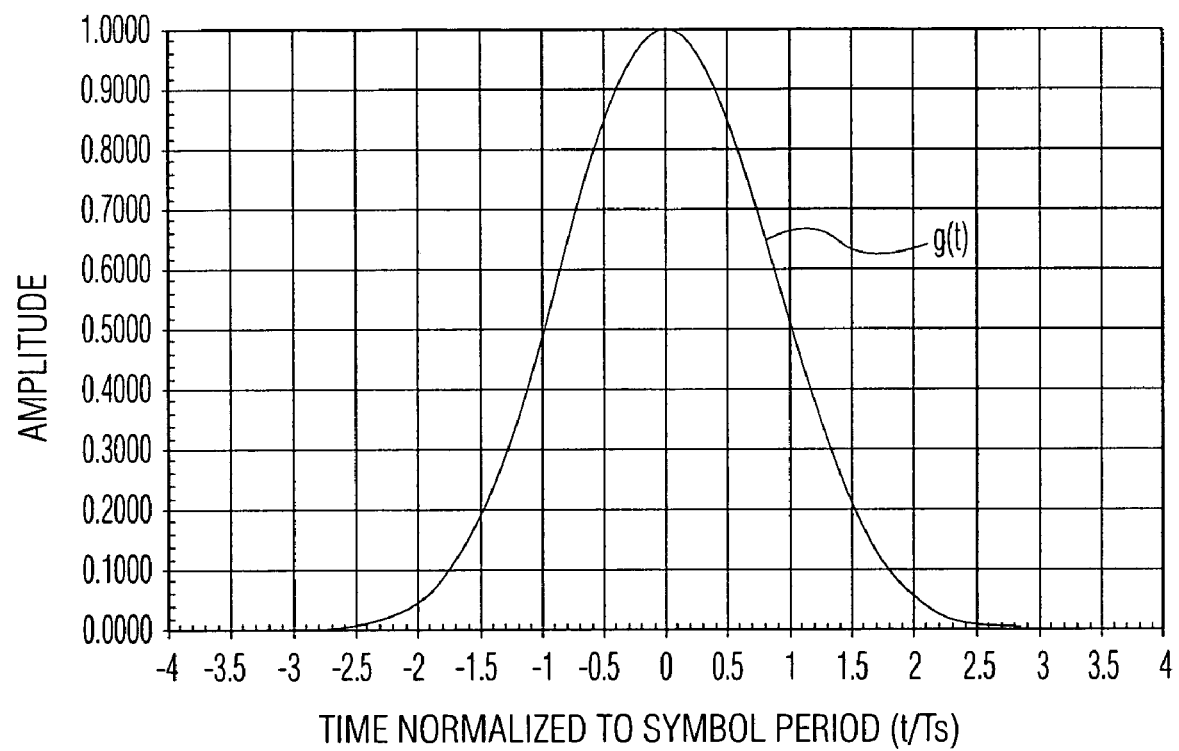
FIG. 3 is a plot of a QBL-MSK autocorrelation function in accordance with an embodiment of the present invention.

Convolution of the QBL-MSK symbol pulse shape with the QBL-MSK symbol matched filter results in the QBL-MSK autocorrelation function {g(t)}, which is shown in FIG. 3. As shown in FIG. 3, the autocorrelation function is zero or near zero for time 2.5 Ts from the desired optimum sampling point (time 0).

Using the QBL-MSK autocorrelation function {g(t)}, the I and Q signals out of the symbol matched filters 216 ad 218 (based on equation 6 and 7) are as show in equations 11 and 12, respectively:

$$x_2(0.5 nT_s) = \left[\sum_{i=0}^{M-1} (-1)^i c_{2i} \cdot g\left(\dfrac{0.5 nT_s -}{2iT_s}\right)\right]\cos(\pi n\Delta f T_s + \phi) + \left[\sum_{i=0}^{M-1} (-1)^i c_{2i+1} \cdot g\left(\dfrac{0.5 nT_s -}{[2i+1]T_s}\right)\right]\sin(\pi n\Delta f T_s + \phi) \tag{11}$$

and $$y_2(0.5 nT_s) = \left[\sum_{i=0}^{M-1} (-1)^i c_{2i} \cdot g\left(\dfrac{0.5 nT_s -}{2iT_s}\right)\right]\sin(\pi n\Delta f T_s + \phi) + \left[\sum_{i=0}^{M-1} (-1)^i c_{2i+1} \cdot g\left(\dfrac{0.5 nT_s -}{[2i+1]T_s}\right)\right]\cos(\pi n\Delta f T_s + \phi); \tag{12}$$

where Δf is the carrier frequency error and φ is the carrier phase change. The carrier frequency error between the transmitter 100 and the receiver 200 is the term being estimated by the carrier frequency estimation operation. The I and Q symbol matched filter outputs are sent to the SYNC and carrier frequency estimation operation for further processing, which is described below.

Figure 4:
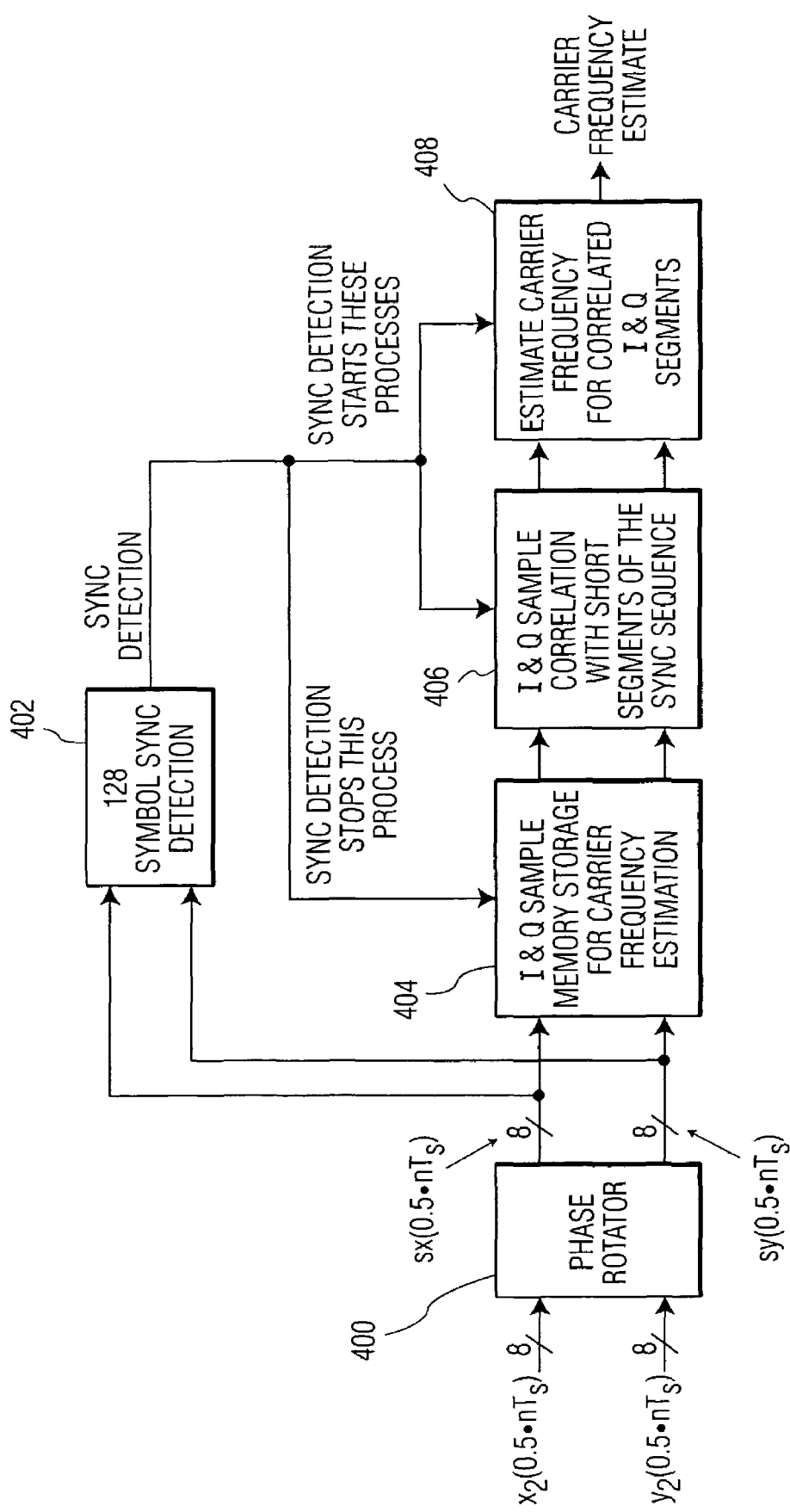
FIG. 4 is a block diagram of a synchronization (SYNC) and carrier frequency estimation block diagram in accordance with an embodiment of the present invention.

FIG. 4 shows a block diagram for an overview of SYNC and carrier frequency estimation operations. First, a phase rotator 400 enables the SQBL-MSK modulated signal to be serially demodulated, which allows the SYNC and carrier frequency estimation I and Q correlation operations to operate against the same SYNC symbol sequence versus having to separate the SYNC symbol sequence into even and odd symbols, which may be performed for a parallel correlator. The two sample per symbol I and Q signal out of the phase rotator 400 is sent to a SYNC detector 402 that implements an algorithm to determine the timing control for selecting the proper sample and reduces the sample rate to the symbol rate for the carrier frequency estimation process. The I and Q received signals are stored in a memory 404. SYNC detection stops the storage of the I and Q received signal in the memory 404 and starts the short segment correlation operation in a correlator 406. In addition, SYNC detection starts carrier frequency error estimation in a carrier frequency estimator 408.

Figure 5:
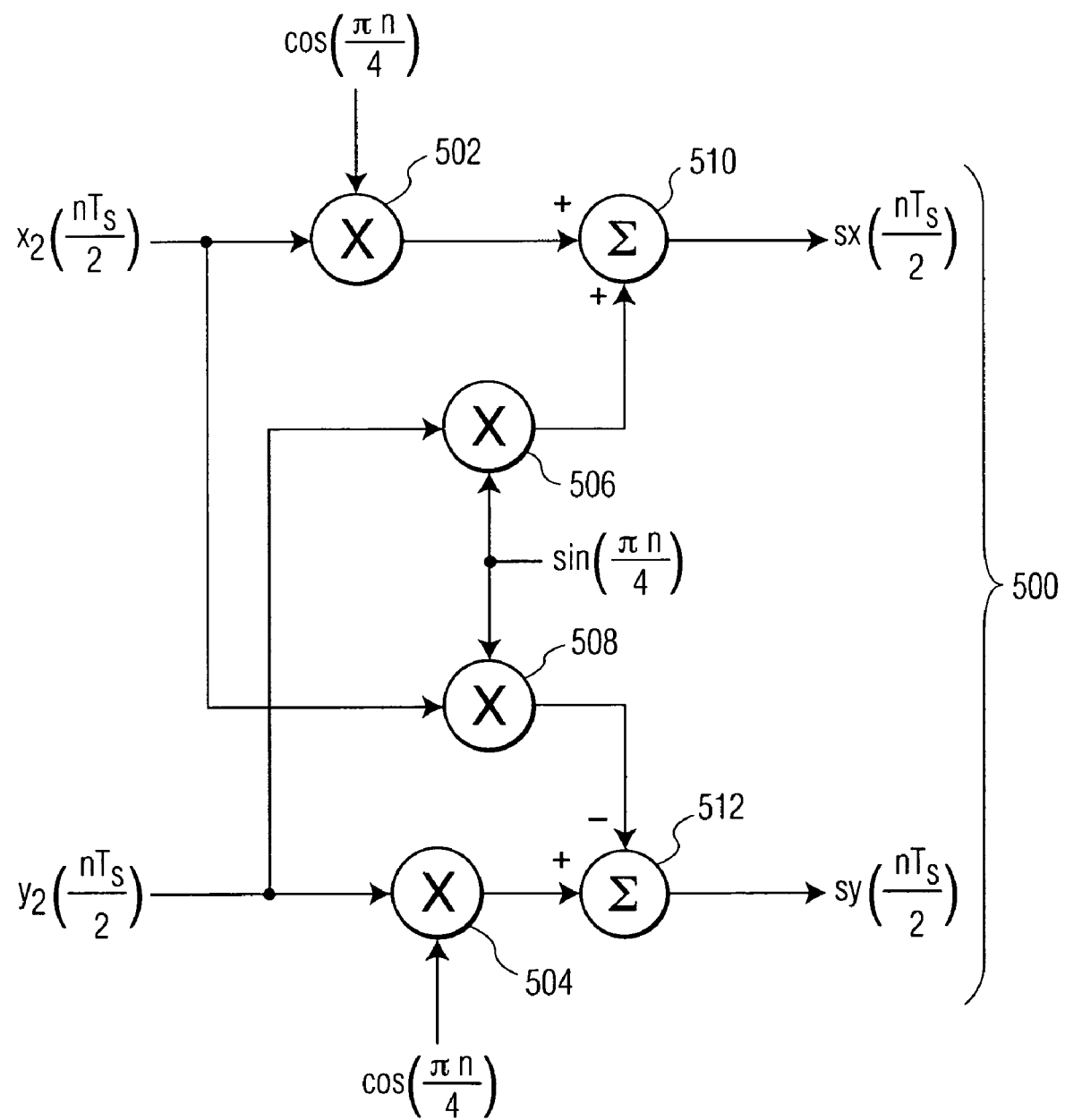
FIG. 5 is a block diagram of a standard phase rotator block diagram in accordance with an embodiment of the present invention.

In an exemplary embodiment, the phase rotator 400 implements a standard phase rotator algorithm. FIG. 5 depicts a block diagram for a standard phase rotator algorithm 500. The standard phase rotator algorithm 500 serially demodulates about a frequency of one quarter the symbol rate below the carrier frequency. As shown in FIG. 5, the I and Q outputs of the symbol matched filters 216 and 218 (FIG. 2), represented by $x_2(nT_s/2)$ and $y_2(nT_s/2)$, enter the phase rotator algorithm 500 to be mixed with a $\cos(\pi n/4)$ signal at mixers 502 and 504, respectively, and a $\sin(\pi n/4)$ signal at mixers 506 and 508, respectively. The outputs from mixers 502 and 506 are combined by summer 510 and the outputs from mixers 504 and 508 are combined by summer 512. The serial I $\{sx(n)\}$ and Q $\{sy(n)\}$ signals output from the phase rotator algorithm 500 are sent to the SYNC detection module described below with reference to FIG. 7 and for storage, which is described below with reference to FIG. 9.

Figure 6:
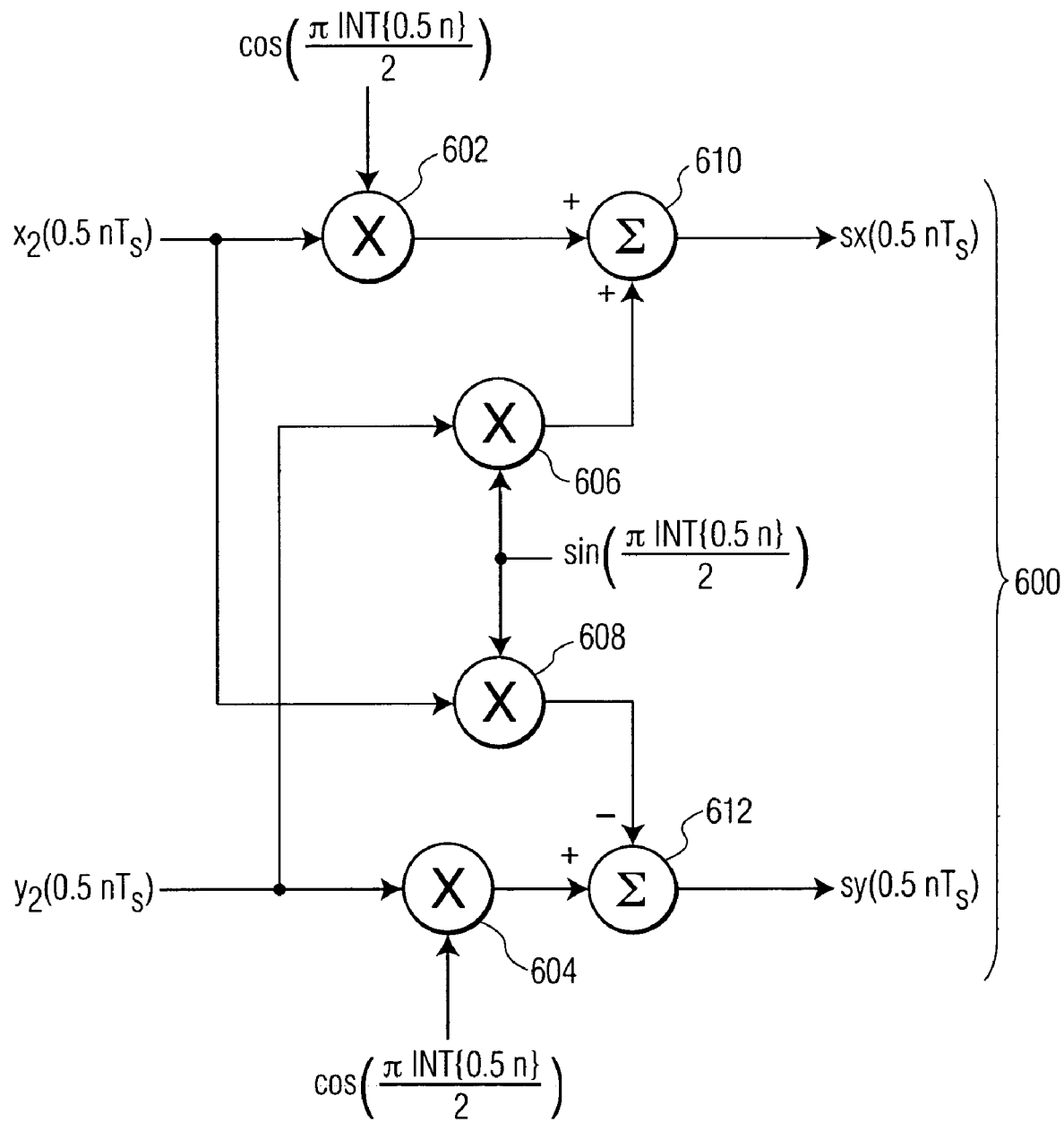
FIG. 6 is a block diagram of a simplified phase rotator block diagram in accordance with an embodiment of the present invention.

In an alternative exemplary embodiment, the phase rotator 400 implements a simplified phase rotator algorithm. FIG. 6 depicts a block diagram for a simplified phase rotator algorithm 600. Since the serial I and Q signals output from the phase rotator 400 (FIG. 4) are decimated by 2 before despreading by selecting either the even or odd samples, the same phase rotation may be applied to both the even and odd samples. As shown in FIG. 6, the I and Q outputs of the symbol matched filters 216 and 218 (FIG. 2), represented by $x_2(0.5nT_s)$ and $y_2(0.5nT_s)$, enter phase rotator 600 to be mixed with a $\cos(\pi \text{INT}\{0.5n\}/2)$ signal at mixers 602 and 604, respectively, and a $\sin(\pi \text{INT}\{0.5n\}/2)$ signal at mixers 606 and 608, respectively. The outputs from mixers 602 and 606 are then sent to summer 610 and the outputs from mixers 604 and 608 are sent to summer 612. The serial I $\{sx(n)\}$ and Q $\{sy(n)\}$ signals output from simplified phase rotator algorithm 600, represented in FIG. 6 by $sx(0.5nT_s)$ and $sy(0.5nT_s)$, are sent to the SYNC detection module described below with reference to FIG. 7 and for storage, which is described below with reference to FIG. 9. The simplified phase rotator algorithm 600 offers lower complexity over the standard phase rotator algorithm 500 (FIG. 5) and enables implementation of serial demodulation.

Figure 7:
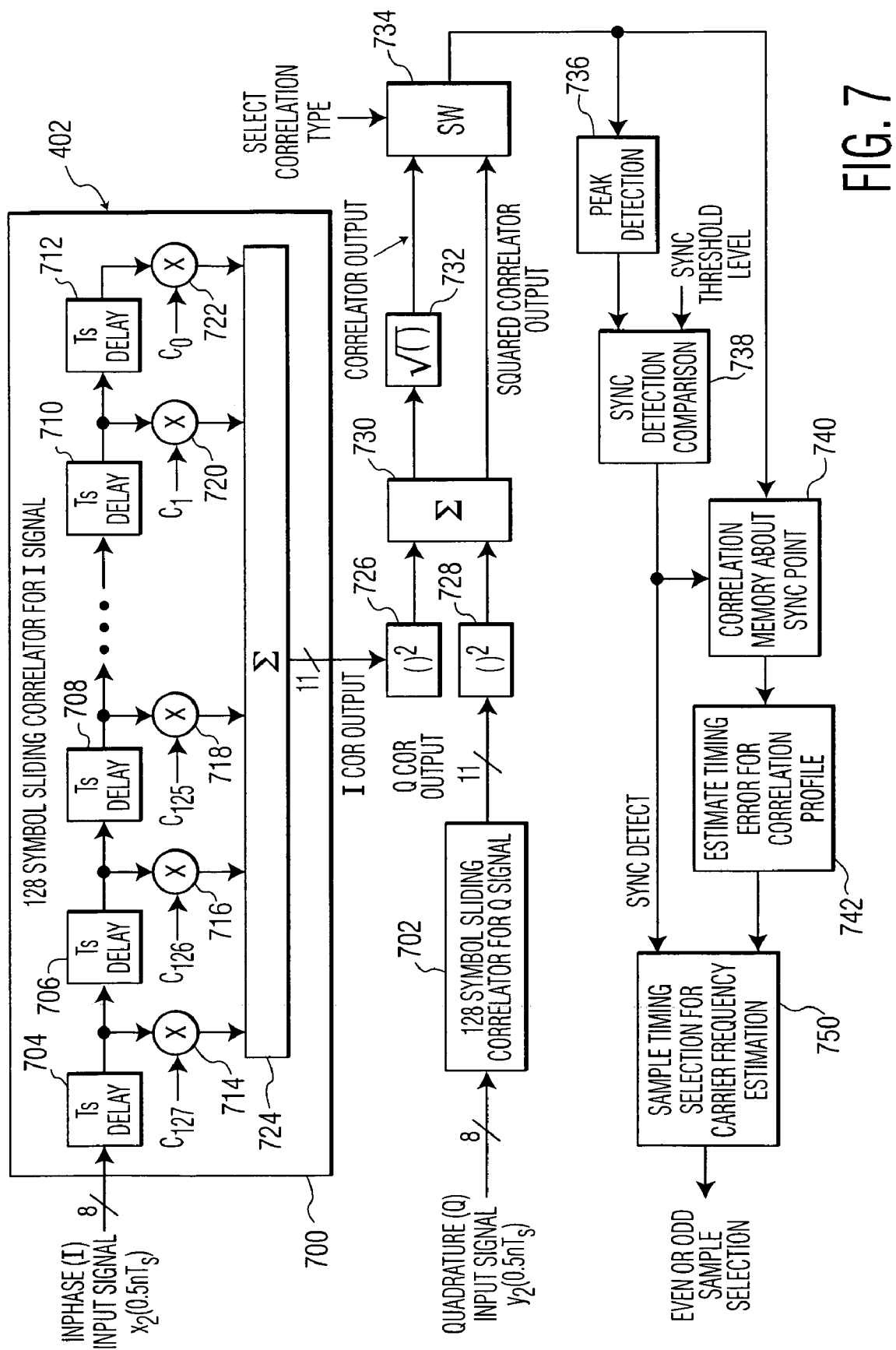
FIG. 7 is a block diagram of a SYNC detection module in accordance with an embodiment of the present invention.

FIG. 7 depicts a block diagram of a SYNC detector 402 used to establish the proper timing for the carrier frequency estimation processes and data processing. As shown in FIG. 7, I and Q samples to the SYNC detector 402 are at twice the symbol rate. Reduction in the complexity of an I signal correlator 700 and a Q signal correlator 702 in the SYNC detector 402 can be achieved by decimating the I and Q samples by a factor of 2. Decimation reduces the sampling rate to be equal to the symbol rate. This decimation is easily achieved by selecting either the even or odd samples into the SYNC detector 402.

As shown in FIG. 7, the sample period for the input correlator signal and delay elements in the correlator are specified by Ts, the symbol period. For operating the SYNC detection algorithm at twice the symbol rate, the delay element is implemented by two sample period delays. For operating the SYNC detection algorithm at the symbol rate, the delay element is implemented by a single sample period delay.

In an exemplary embodiment, the symbol sliding correlators 700 and 702 for the input I and Q signals are substantially identical and, thus their operation will be described with reference to the symbol sliding correlator 700 for the I signal only. The symbol sliding correlator 700 includes a sliding length of 128 symbols, represented by delay elements 704, 706, 708, 710, and 712 in FIG. 7, which are, respectively, coupled to mixers 714, 716, 718, 720, and 722 for multiplication with respective spreading code signals of $\{c_{127}, c_{126}, c_{125}, \ldots, c_0\}$. The 128 mixed signals are summed by summer 724. The SYNC length is not unique to the present invention and may be made shorter or longer. Also, the full 128 symbol correlation does not need to be coherently combined over the full 128 symbol sequence. For example, the 128 symbol correlation may be coherently combined over 32 symbol segments followed by a noncoherent combining of the four 32 symbol segments. Neither the SYNC sequence length nor the correlation structure shown are unique to the SYNC detection for the carrier frequency estimation process.

As shown in FIG. 7, the I and Q correlator output signals are, respectively, squared by squaring functions 726 and 728, and then combined by summer 730. SYNC detection, it will be understood, may be determined by using either the square of the correlation output or the correlation output (generated by square root module 732). Either correlation output may be used.

Typically, the correlation output is selected by switch 734 and may easily be implemented using the approximation of equation 13:

$$COR(n) = \text{Max}\{MAG[ICOR(n)], MAG[QCOR(n)]\} + \frac{1}{2} \cdot \text{Min}\{MAG[ICOR(n)], MAG[QCOR(n)]\}; \quad (13)$$

where Max{ } is the maximum value of its two arguments, Min{ } is the minimum value of its two arguments, and Mag[ ] is the magnitude of its argument.

Figure 8:
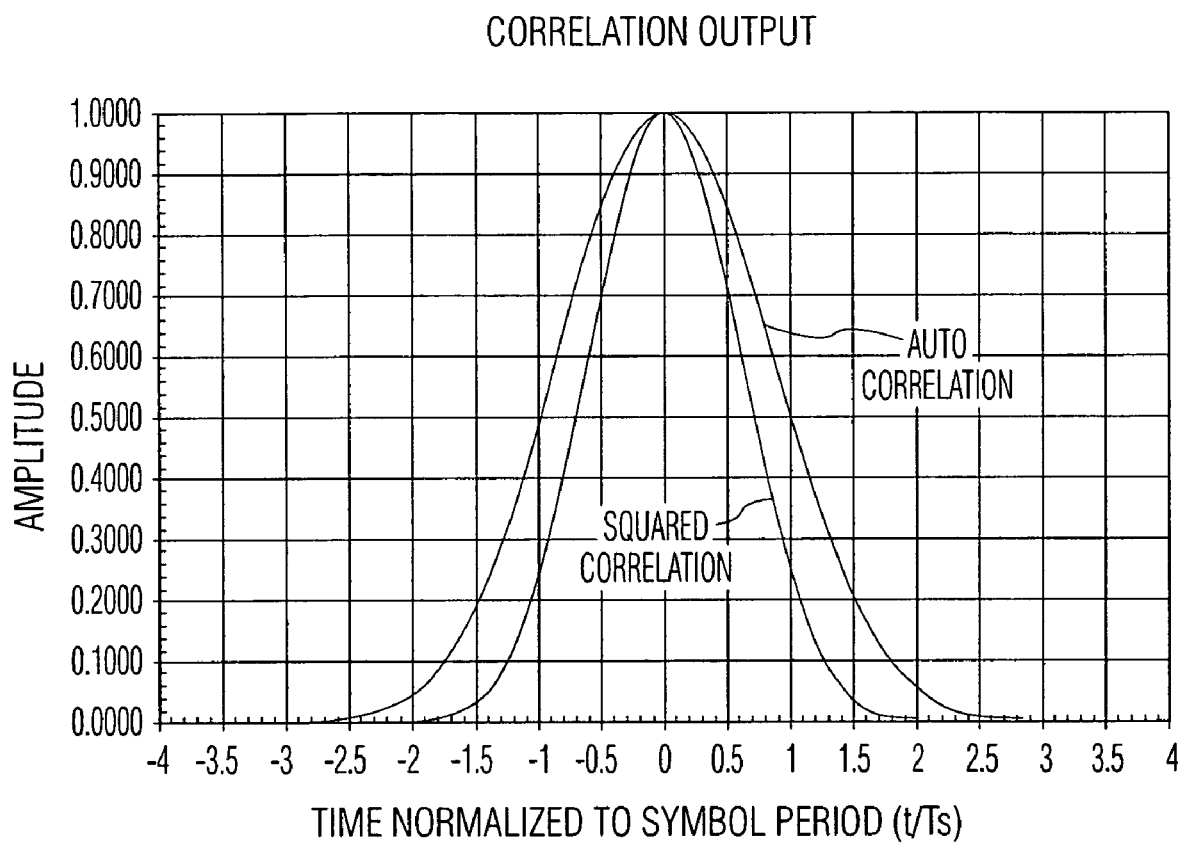
FIG. 8 is a plot of a SYNC correlation curve for use with the SYNC detection module of FIG. 7

The signal used as an input signal to peak detection module 736, for each of the two different correlation outputs is shown in FIG. 8. For the square-root output, the correlation signal to the peak detector is the QBL-MSK autocorrelation function, while the squared output is the square of the QBL-MSK autocorrelation function. As may be seen, the correlation response for the squared QBL-MSK autocorrelation function is sharper than the QBL-MSK autocorrelation function, as expected.

Since the correlation response is different depending on the input signal, the time error estimation is also dependent on which input signal is used. By comparing the amplitude of three adjacent samples, peak detection module 736 determines if a peak has occurred at the center sample. If the center sample is declared to be a peak, the magnitude of that sample (peak sample) is compared to the SYNC threshold by SYNC detection comparison module 738. If the magnitude of the peak sample is greater than the SYNC threshold, the SYNC detection comparison module 738 declares SYNC and sends a signal to sample timing selection module 750.

SYNC determines the time location of the first sample and whether even or odd samples are processed in the carrier frequency estimation process. If the SYNC process is operated at twice the symbol rate, a SYNC point within $\pm 0.25 \cdot T_s$ is determined directly by the peak detection. For the SYNC process operating at the symbol rate, the SYNC detection point along with the correlation profile is used to establish the SYNC point within a resolution of $\pm 0.25 \cdot T_s$, as described below.

Using the correlation output based on the QBL-MSK autocorrelation response of FIG. 8 and operating the SYNC detection at the symbol rate, an exemplary mapping to obtain a finer timing resolution (±0.25·$T_s$) is outlined below:

(a) select sample $nT_s$−0.5 $T_s$ if COR(n−1)≧2·COR(n+1); −Ts/2 correction implemented
   (odd sample before the even sample used in the SYNC detection) or
(b) select sample $nT_s$+0.5 $T_s$ if COR(n+1)≧2·COR(n−1); +Ts/2 correction implemented
   (odd sample after the even sample used in the SYNC detection) or
(c) select sample $nT_s$;
   no correction if neither of the two above conditions is met;

where the SYNC I and Q inputs are the even samples only, COR($nT_s$) is the peak location, COR([n+1]$T_s$) is the sample after the peak, and COR([n−1]$T_s$) is the sample before the peak. In this manner, sample timing selection module 750 chooses the even or the odd samples based on these three relationships. In addition, from these three relationships, the proper samples output from the memory 404 are used for the carrier frequency estimation process described below with reference to FIG. 12.

During SYNC detection, a correlation profile based on peak correlation levels are determined about the SYNC point established by correlation memory module 740. The time interval over which this profile is generated is referred to as the multi-path window. Based on the peak magnitude level of the correlation profile, multi-path RAKE taps are selected with symbol timing and timing error estimation for the phase correction module for each tap. An estimate timing error module 742 provides timing error estimates.

Figure 9:
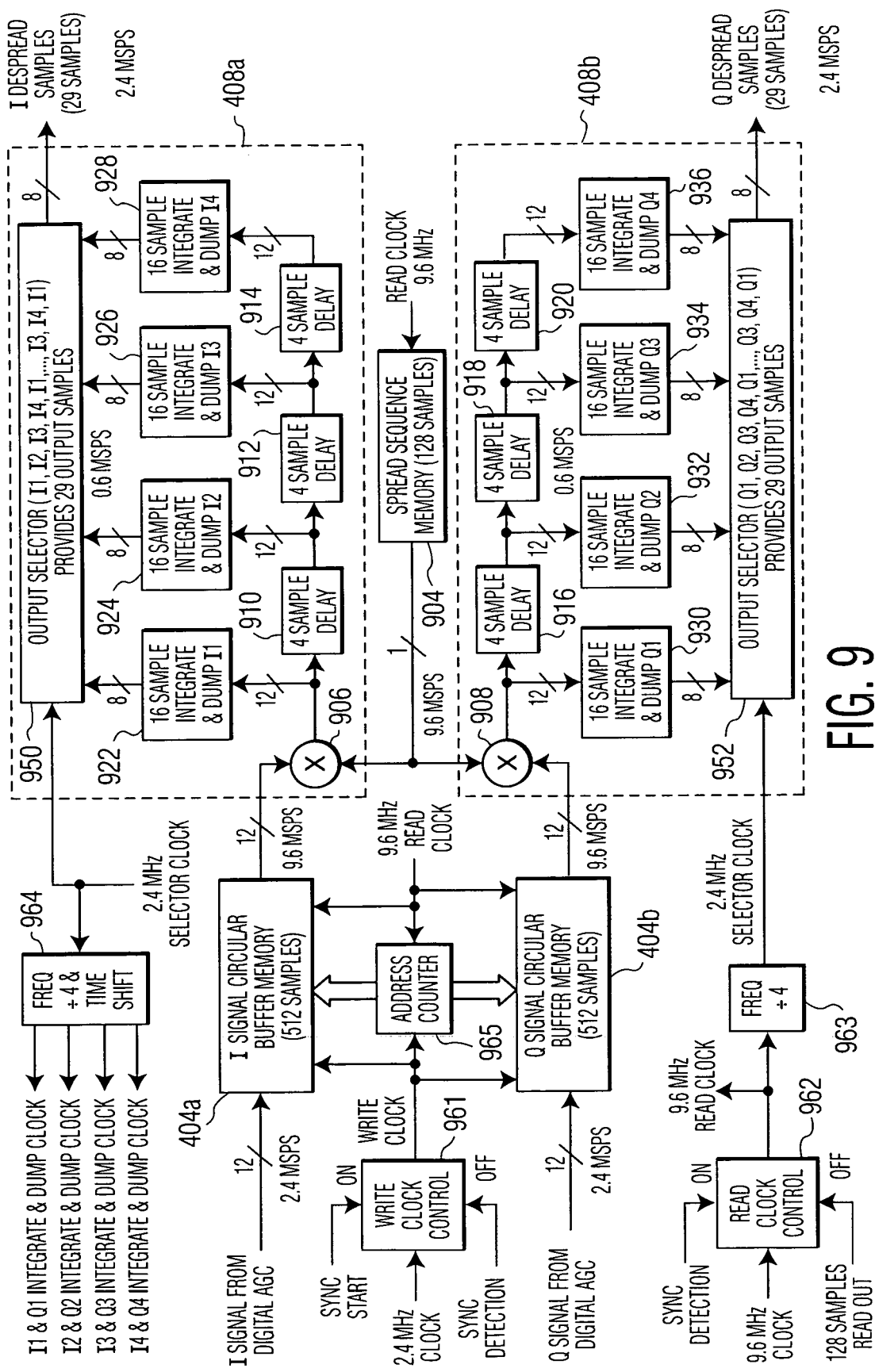
FIG. 9 is a block diagram of an inphase (I) signal and quadrature (Q) phase signal storage and correlation for carrier frequency estimation in accordance with an embodiment of the present invention.

FIG. 9 shows a block diagram for the I and Q memory storage and correlation processes for the carrier frequency estimation approach. The serial I {sx(0.5nTs)} and Q {sy(0.5nTs)} signal samples out of the phase rotator 400 (FIG. 4) are stored in respective memories, e.g., circular buffer memories 404a and 404b, while the SYNC detection process is being performed. In an exemplary embodiment, each memory 404a and 404b is a 512 sample circular buffer memory that provides more sample memory than the 256 (operating SYNC at 2 times the symbol rate) to 257 (operating SYNC at the symbol rate) samples required to hold the 128 SYNC symbols at 2 samples per symbol. A smaller number of samples in the memories can be used without impacting the carrier frequency estimation algorithm.

Circular buffers allows I and Q memories 404a and 404b to be loaded until SYNC is detected. By knowing the address at which the circular buffer loads the last I & Q SYNC symbol into the I & Q memories 404a and 404b by the occurrence SYNC detection, the address count can be set to the first I & Q SYNC symbol loaded into the I & Q memories 404a and 404b.

Figure 10:
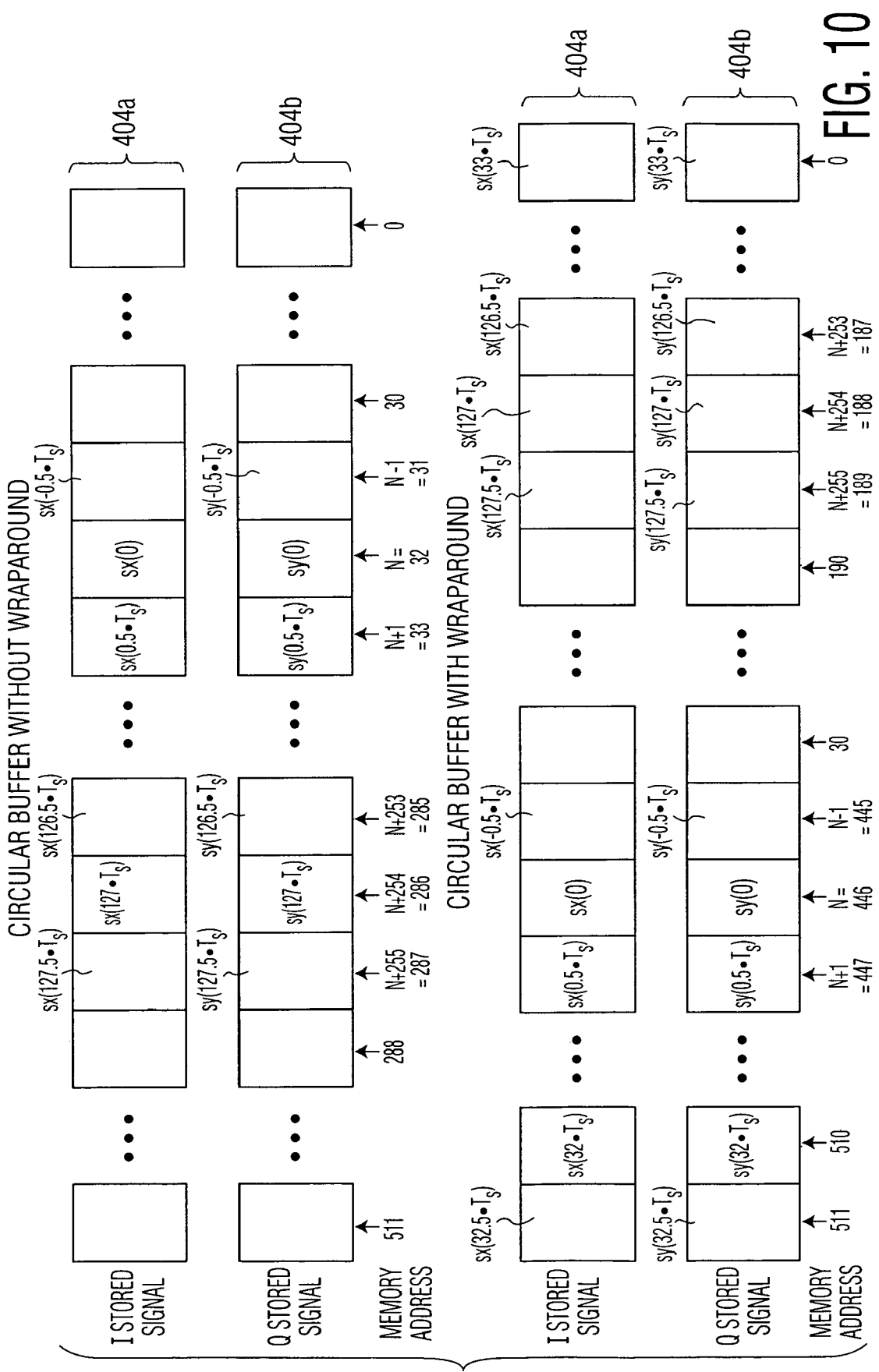
FIG. 10 is a block diagram of a circular buffer with and without wrap around in accordance with an embodiment of the present invention.

FIG. 10 shows a block diagram of two possible memory conditions. The first conditions occurs when there is no wrap around in the circular buffers of memories 404a and 404b, while the second condition is when there is wrap around in the circular buffers of memories 404a and 404b. If the memory address at the SYNC point is greater than or equal to 254 for 2 sample per symbol operation in the SYNC detection or greater than or equal to 255 for 1 sample per symbol operation in the SYNC detection, no wrap around occurs in the circular buffers of memories 404a and 404b.

The example condition without wrap around in the circular buffer shows SYNC occurring at either memory address location 285, 286, or 287 dependent on the symbol timing error. Letting Ns represent the memory address location of SYNC, the first SYNC symbol is located at Ns−254. The SYNC symbols read out of the circular buffers of memories 404a and 404b for correlation with the SYNC sequence start at memory address Ns−254 with the memory address increased in increments of 2 to obtain the 128 samples for processing. For this memory condition example and defining 286 as the on-time SYNC point for ideal timing, the memory is read out as follows:

1) For on-time SYNC at 286: read out even samples 32, 34, 36, ..., 282, 284, 286
2) For early SYNC at 285: read out odd samples 31, 33, 35, ..., 281, 283, 285
3) For late SYNC at 287: read out odd samples 33, 35, 37, ..., 283, 285, 287.

For all three possible SYNC points, 128 samples are read out of the circular buffers of the memories 404a and 404b.

The second example given in FIG. 10 is an example condition with wrap around in the circular buffers of memories 404a and 404b and with SYNC occurring at either memory address location 187, 188, or 189 dependent on the symbol timing error. Letting Ns represent the memory address location of SYNC, the first SYNC symbol is located at Ns+258. The SYNC symbols read out of the circular buffers for memories 404a and 404b for correlation with the SYNC sequence start at memory address Ns+258 with the memory address increased in increments of 2 until it reaches the end of the circular buffers of memories 404a and 404b and then wraps around to the start of the circular buffers of memories 404a and 404b using the same increment of 2 until all the 128 samples for processing are read out. For this memory condition example and defining 188 as the on-time SYNC point for ideal timing, the memory is read out as follows:

1) For on-time SYNC at 188: read out even samples 446, 448, ..., 508, 510, 0, 2, ..., 186, 188
2) For early SYNC at 187: read out odd samples 445, 447, ..., 509, 511, 1, 3, ..., 185, 187
3) For late SYNC at 189: read out odd samples 447, 449, ..., 509, 511, 1, 3, ..., 187, 189.

For all three possible SYNC points, 128 samples are read out of the circular buffers of the memories 404a and 404b.

The serial I and Q signals read out of the circular buffer based on SYNC detection are given by the following equation:

$$sx(nT_s) = x_2(nT_s + \Delta T_s) \cdot \cos\left(\frac{\pi n}{2} + \theta\right) + y_2(nT_s + \Delta T_s) \cdot \sin\left(\frac{\pi n}{2} + \theta\right) \quad (14)$$

and $$sy(nT_s) = -x_2(nT_s + \Delta T_s) \cdot \sin\left(\frac{\pi n}{2} + \theta\right) + y_s(nT_s + \Delta T_s) \cdot \cos\left(\frac{\pi n}{2} + \theta\right); \quad (15)$$

where ΔTs is the timing error (±Ts/4 maximum) not removed by the SYNC timing correction and θ represents one of the four possible timing conditions the phase rotator 400 (FIG. 4) can be in dependent on timing error. The phase associated with the phase rotator 400 is equal to either −90, 0, 90, or 180 degrees. Inserting the equations for $x_2(nTs)$ and $y_2(nTs)$ and applying simplifications (such as described in "Serial Demodulation of Offset Quadrature Pulse-Shaped Signals" by D. J. Rasmussen, PhD Dissertation, Arizona State University, May 1993, pp. 11-50) to these equations produces equations 16 and 17, respectively:

$$sx(nT_s) = \left[\sum_{i=0}^{2M-1} c_i \cdot g([nT_s + \Delta T_s] - iT_s) \cdot \cos\left(\frac{\pi[nT_s - iT_s]}{2T_s}\right)\right] \quad (16)$$

$$\cos(2\pi n \Delta f T_s + \theta_c) -$$

$$\left[\sum_{i=0}^{M-1} c_i \cdot g([nT_s + \Delta T_s] - iT_s) \cdot \sin\left(\frac{\pi[nT_s - iT_s]}{2T_s}\right)\right]$$

$$\sin(2\pi n \Delta f T_s + \theta_c)$$

and $$sy(nT_s) = \left[\sum_{i=0}^{2M-1} c_i \cdot g([nT_s + \Delta T_s] - iT_s) \cdot \cos\left(\frac{\pi[nT_s - iT_s]}{2T_s}\right)\right] \quad (17)$$

$$\sin(2\pi n \Delta f T_s + \theta_c) -$$

$$\left[\sum_{i=0}^{M-1} c_i \cdot g([nT_s + \Delta T_s] - iT_s) \cdot \sin\left(\frac{\pi[nT_s - iT_s]}{2T_s}\right)\right]$$

$$\cos(2\pi n \Delta f T_s + \theta_c);$$

where $$\theta_c = \theta + \phi. \quad (18)$$

The phase error introduced by the down-conversion operation ($\phi$) and the phase error introduced by the phase rotator 400 ($\theta$) can be combined into a total carrier phase error term ($\theta_c$). From these equations, two key features of serial demodulation can be seen. First, the serial formatting factor $(-1)^i$ seen in the modulation equation 4 is removed. Secondly, it can be seen that the I and Q baseband signals consist of the filtered SYNC sequence multiplied by either a cosine or sine weighting function. From FIG. 8 (autocorrelation curve), the QBL-MSK autocorrelation function is nonzero for ±2.5 Ts about the ideal SYNC time of zero. Since the cosine weighting function shall force the QBL-MSK autocorrelation function to zero at times $-T_s+\Delta T_s$ and $T_s+\Delta T_s$, only the QBL-MSK terms at $-2T_s+\Delta T_s$, $\Delta T_s$, and $2T_s+\Delta T_s$ need to be considered for each cosine weighted QBL-MSK autocorrelation symbol response. Similarly, the sine weighting function shall force the QBL-MSK autocorrelation function to zero at times $-2T_s+\Delta T_s$, $\Delta T_s$, and $2T_s+\Delta T_s$, so only the QBL-MSK terms $-T_s+\Delta T_s$ and $T_s+\Delta T_s$ need to be considered for each sine weighted QBL-MSK autocorrelation symbol response. Using this information, the equations for the serial I and Q signal can be rewritten as equations 19 and 20:

$$sx(nT_s) = \sum_{i=0}^{2M-1} c_i \cdot \{g(\Delta T_s)\delta(n-i) \cdot \cos(2\pi n \Delta f T_s + \theta_c) - \quad (19)$$

$$g(-2T_s + \Delta T_s)\delta(n+2-i) \cdot \cos(2\pi[n+2]\Delta f T_s + \theta_c) -$$

$$g(2T_s + \Delta T_s)\delta(n-2-i) \cdot \cos(2\pi[n-2]\Delta f T_s + \theta_c)\} -$$

$$\left[\sum_{i=0}^{2M-1} c_i \cdot \{-g(-T_s + \Delta T_s)\delta(n+1-i) \cdot \sin(2\pi[n+1]\Delta f T_s + \theta_c) + \right.$$

$$\left. g(T_s + \Delta T_s)\delta(n-1-i) \cdot \sin(2\pi[n-1]\Delta f T_s + \theta_c)\}\right]$$

and $$sy(nT_s) = \quad (20)$$

$$-\left[\sum_{i=0}^{2M-1} c_i \cdot \{g(\Delta T_s)\delta(n-i) \cdot \sin(2\pi n \Delta f T_s + \theta_c) - g(-2T_s + \Delta T_s)\right.$$

$$\delta(n+2-i) \cdot \sin(2\pi[n+2]\Delta f T_s + \theta_c) -$$

$$\left. g(2T_s + \Delta T_s)\delta(n-2-i) \cdot \sin(2\pi[n-2]\Delta f T_s + \theta_c)\}\right] -$$

$$\left[\sum_{i=0}^{2M-1} c_i \cdot \{-g(-T_s + \Delta T_s)\delta(n+1-i) \cdot \cos(2\pi[n+1]\Delta f T_s + \theta_c) + \right.$$

$$\left. g(T_s + \Delta T_s)\delta(n-1-i) \cdot \cos(2\pi[n-1]\Delta f T_s + \theta_c)\}\right]$$

where $\delta(n)$ is the unit impulse function, which is equal to 1 for n equal to zero and equal to 0 for all other values of n. The serial I and Q signals can be rewritten as shown in equations 21 and 22:

$$sx(nT_s) = \quad (21)$$

$$\sum_{i=0}^{2M-1} [c_i \cdot \alpha_0 - c_{i+2} \cdot \alpha_2 - c_{i-2} \cdot \alpha_2]\delta(n-i)\cos(2\pi n f T_s + \theta_c) -$$

$$\sum_{i=0}^{2M-1} [-c_{i+1} \cdot \alpha_{-1} + c_{i-1} \cdot \alpha_1]\delta(n-i)\sin(2\pi n \Delta f T_s + \theta_c)$$

and $$sy(nT_s) = -\sum_{i=0}^{2M-1} [c_i \cdot \alpha_0 - c_{i+2} \cdot \alpha_{-2} - c_{i-2} \cdot \alpha_2] \quad (22)$$

$$\delta(n-i)\sin(2\pi n f T_s + \theta_c) -$$

$$\sum_{i=0}^{2M-1} [-c_{i+1} \cdot \alpha_{-1} + c_{i-1} \cdot \alpha_1]\delta(n-i)\cos(2\pi n \Delta f T_s + \theta_c);$$

where $$\alpha_n = g(nT_s + \Delta T_s). \quad (23)$$

Equations 21 and 22 illustrate that the serial I and Q signals consist of the desired SYNC sequence multiplied by the sinusoidal carrier frequency error term and the undesired cross-correlation properties of the SYNC sequence. For SYNC sequences with low cross-correlation property over the correlation segments, these cross-correlation terms are negligible. Removing these terms from the serial I and Q signals results in equations 24 and 25:

$$sx_a(nT_s) = \sum_{i=0}^{2M-1} [c_i \cdot \alpha_0]\delta(n-i)\cos(2\pi n \Delta f T_s + \theta_c) \quad (24)$$

and $$sy_a(nT_s) = -\sum_{i=0}^{2M-1} [c_i \cdot \alpha_0]\delta(n-i)\sin(2\pi n \Delta f T_s + \theta_c). \quad (25)$$

Referring back to FIG. 9, removing the SYNC sequence from the serial I and Q signal through correlation provides the carrier information in the cosine and sine terms used to estimate the carrier frequency error. The I and Q signals are mixed with a spread sequence read from memory 904 using respective mixers 906 and 908. As shown in FIG. 9, the serial I and Q signals are each correlated over 16 samples with a 4 sample shift between each correlation, represented by sample delays 910, 912, and 914 for the serial I signals and sample delays 916, 918, and 920 for the serial Q signals. Increasing the number of samples in the correlation operation reduces the error introduced by the cross-correlation terms in the serial I and Q signal. A larger number of correlation samples for carrier frequency estimation may be used to improve carrier frequency estimation. For a 128 symbol SYNC sequence, the maximum number of correlated samples is 128, if a 1 sample correlation is used. To prevent errors introduced by the cross-correlation terms in the serial I and Q signals, the correlation is not reduced to 1 sample. For a 16 sample correlation, a maximum number of 112 correlation samples are available, if a 1 sample shift is provided between each correlation. To achieve 112 correlation samples, 16 independent correlator segments are used for both the I and Q signal. By increasing to a 4 sample shift between each correlation, the number of independent correlator segments for both the I and Q signal is reduced to 4 as shown in FIG. 9 (i.e., correlator segments 922-928 for the I signal and correlator segments 930-936 for the Q signal). Respective output selectors 950 and 952 properly select the correlated I and Q despread samples out of the correlators 404a and 404b. Timing components (e.g., write clock control 961, read clock control 962, frequency divider 963, and frequency divider and time shifter 964) and an address counter 965 control timing, reading, and writing within the system.

Figure 11:
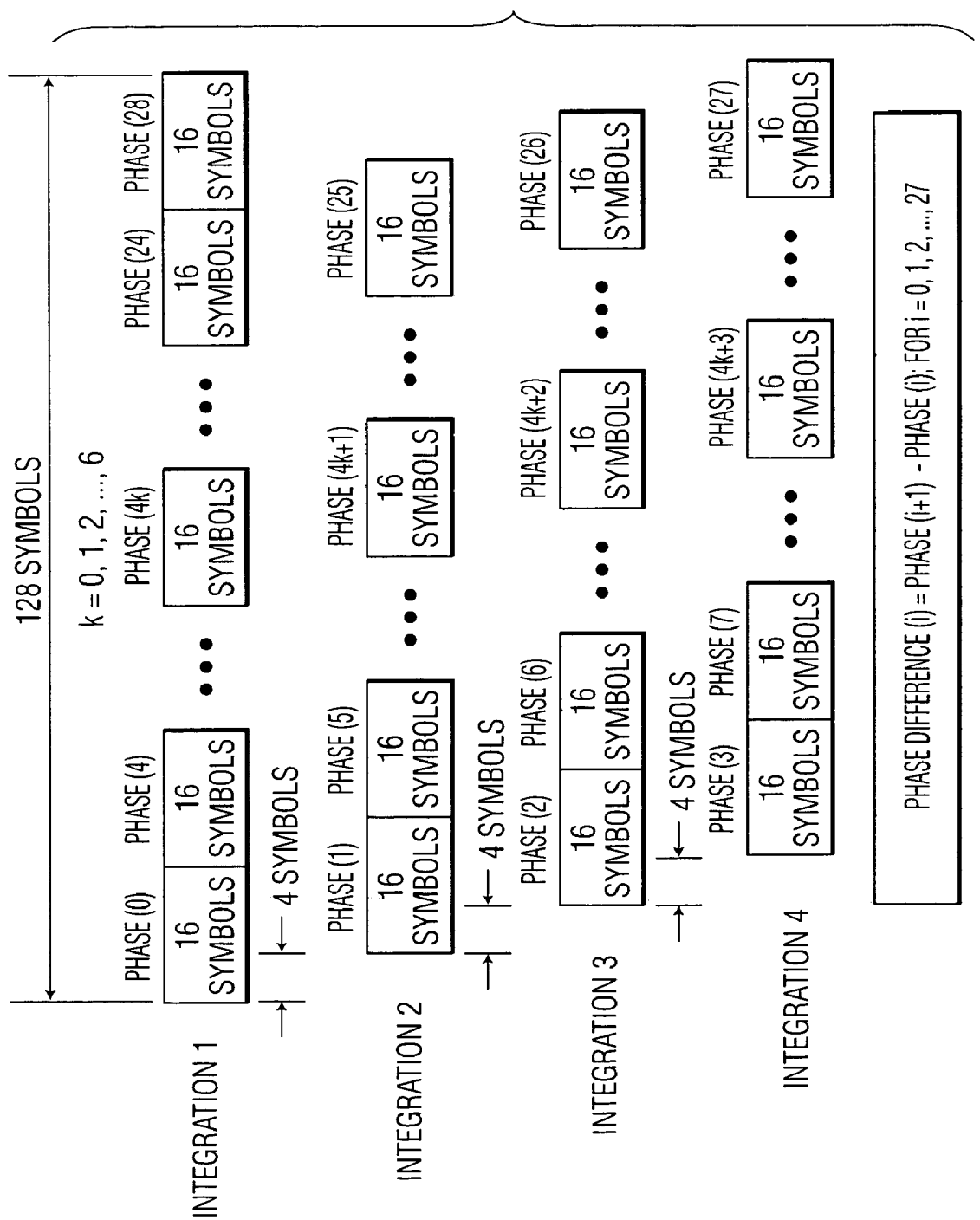
FIG. 11 is a block diagram of a correlation operation in accordance with an embodiment of the present invention.

FIG. 11 shows a block diagram of a correlation operation that uses phases developed from the samples produced by the independent correlator segments illustrated in FIG. 9 (which is described in further detail below with reference to FIG. 12) to obtain 29 phase samples {Phase(0) to Phase(28)} for carrier frequency estimation. The I and Q correlator outputs are described by equations 26 and 27, respectively:

$$I(4m) = \sum_{i=4m}^{15+4m} \alpha_0 \cdot \cos(2\pi i \Delta f T_s + \theta_c) \quad \text{(eqn 26)}$$

$$= 16 \left[ \frac{\sin(16\pi \Delta f T_s)}{16 \cdot \sin(\pi \Delta f T_s)} \right] \cos(2\pi[4m]\Delta f T + \pi 15 \Delta f T_s + \theta_c)$$

$$Q(4m) = -\sum_{i=4m}^{15+4m} \alpha_0 \cdot \cos(2\pi i \Delta f T_s + \theta_c) \quad \text{(eqn 27)}$$

$$= -16 \left[ \frac{\sin(16\pi \Delta f T_s)}{16 \cdot \sin(\pi \Delta f T_s)} \right] \sin(2\pi[4m]\Delta f T + \pi 15 \Delta f T_s + \theta_c)$$

where m is the correlation output sample that goes from 0 to 28, which provides 29 I and Q correlation samples. Equations 26 and 27 illustrate that the carrier frequency error affects the amplitude of the cosine and sine terms. These amplitude terms are determined by the carrier frequency error, the number of correlation samples, and the symbol period. In an exemplary embodiment, the maximum carrier frequency for this approach is set by equation 28.

$$M\pi\Delta f_{\max} T_s = \frac{\pi}{4}; \quad (28)$$

where M is the number of correlation samples, which is equal to 16 for the example. This relationship minimizes the reduction in the amplitude to less than 3 dB. If the carrier frequency is larger than the maximum carrier frequency determined by this equation, the number of correlation samples can be reduced to 8. Since the amplitude and phase values on both the I and Q signals are equal, the carrier information can be estimated from the correlation samples. The 29 I and Q correlation samples from the respective correlators 408a and 408b (FIGS. 4 and 9) are sent to estimator 408 that implements the carrier frequency estimation algorithm.

Figure 12:
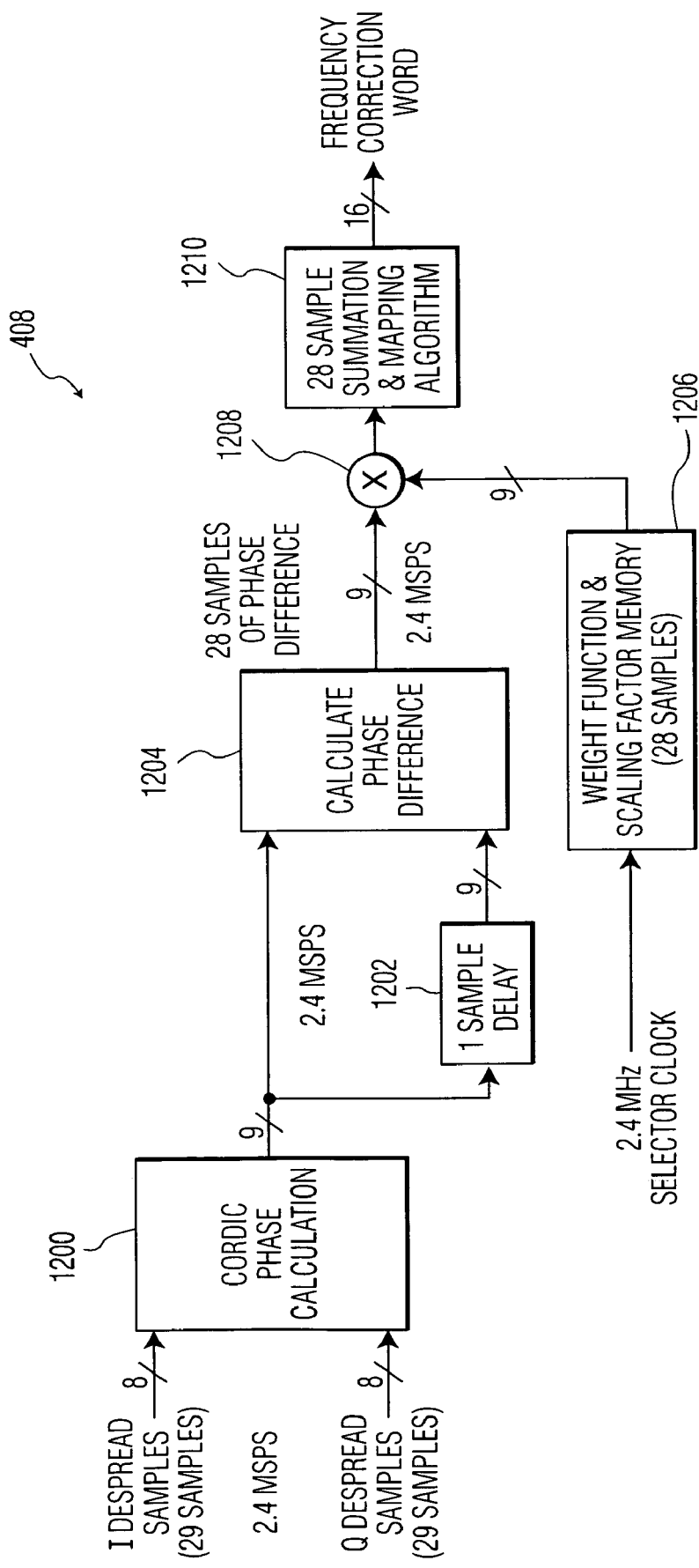
FIG. 12 is a block diagram of a carrier frequency algorithm in accordance with an embodiment of the present invention.

FIG. 12 shows a block diagram of the estimator 408, in which the differential phase $\Delta\theta_e$ between correlation samples is calculated directly using consecutive phase outputs of a Coordinate Rotation DIgital Computer (CORDIC) 1200. In this example, the CORDIC 1200 calculates a 9-bit phase output using 6 iterations, and is constrained to the first and fourth quadrants ($-\pi/2 \leq \theta < \pi/2$). Phase unwrapping is not necessary in the hardware implementation due to the sign-representation properties of the two's complement numbering system. The output phase estimate from the CORDIC 1200 is shown in equations 29.

$$\theta_e(4m) = -2\pi[4m]\Delta f T_s + \pi 15 \Delta f T_s + \theta_c, \text{for } m=0,1,\ldots 28 \quad (29)$$

where the phase estimate is negative, since the sine term is negative. The differential phase estimation used to estimate the carrier frequency is shown by equation 30.

$$\Delta\theta_e(4m+4) = -2\pi[4m+4]\Delta f T_s + 2\pi[4m]\Delta f T \quad (30)$$

$$= \sim 2\pi\Delta f[4T_s], \text{ for } m = 0,1,\ldots 27.$$

In an exemplary embodiment, a one sample delay 1202 is used to introduce a delay to the phase output signal. The phase output signal and the delayed phase output signal are processed by a phase difference calculator 1204 to generated 28 phase difference samples (e.g., by calculating the phase difference between each sample and the next sample, see FIG. 11). A mixer 1208 multiplies the 28 phase samples by a weighting function retrieved from a weight function and scaling factor memory 1206. In an exemplary embodiment, an improved weighting function that approximates Kay's weighting function from equation 2 is used as the weighting function. The improved weighting function reduces the hardware complexity and is defined by equation 31.

$$w_k = \begin{cases} 1/8 * 1/16, & k = 0,27 \\ 1/4 * 1/16, & k = 1,26 \\ (1/8 + 1/4) * 1/16, & k = 2,3,24,25 \\ 1/2 * 1/16, & k = 4,23 \\ (1/2 + 1/8) * 1/16, & 5 \leq k \leq 7, 20 \leq k \leq 22 \\ (1/2 + 1/4) * 1/16, & 8 \leq k \leq 19. \end{cases} \quad (31)$$

Figure 13:
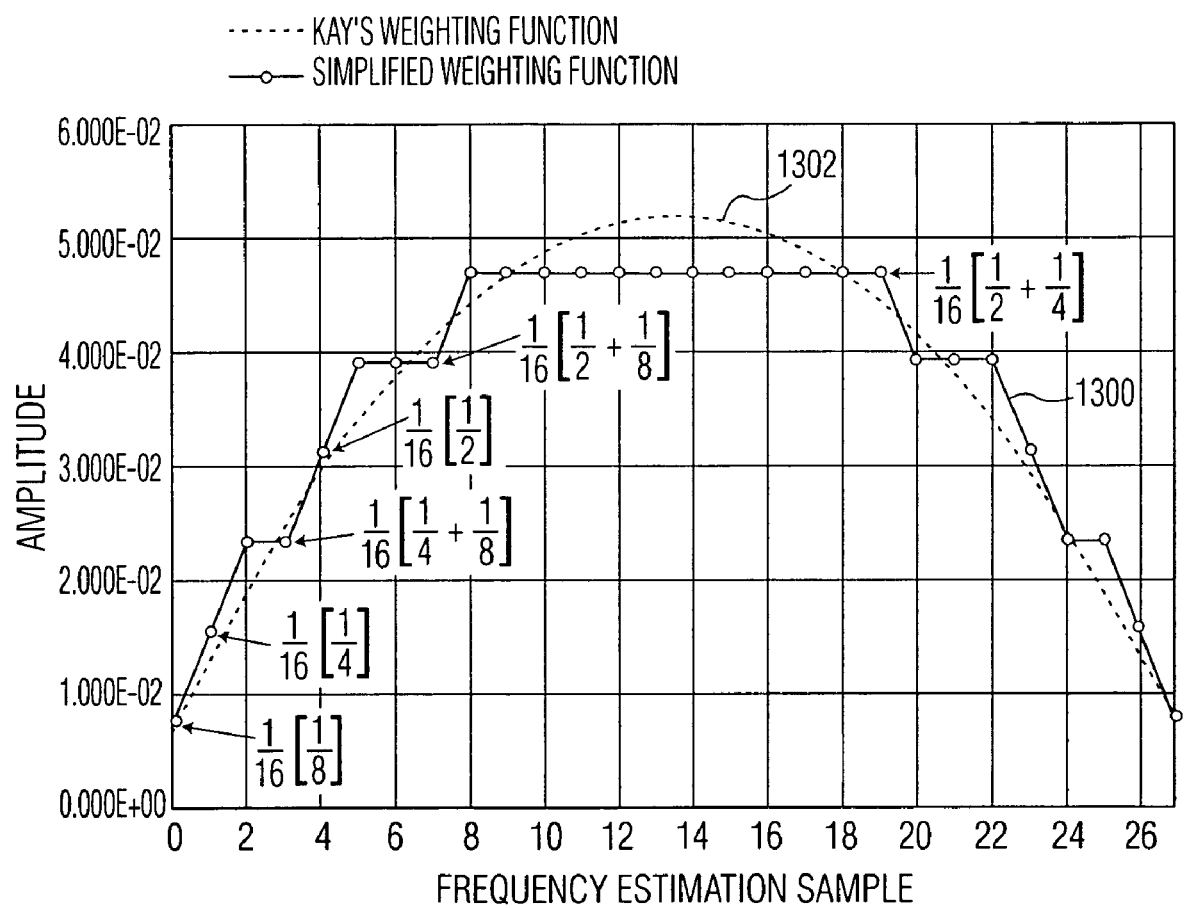
FIG. 13 is a plot of a frequency weighting function in accordance with an embodiment of the present invention.

FIG. 13 shows a plot of the improved weighting function 1300 along with Kay's weighting function 1302. Following the weighting function and summation, the carrier frequency estimate is then mapped into a 16-bit frequency correction word illustrated by equation 32.

$$\Delta f_e = \left[ \frac{A}{2\pi \cdot 4T_s} \right] \sum_{k=0}^{27} w_k \cdot \Delta\theta_e(k); \quad (32)$$

where 4Ts removes the time interval for the phase calculation, $2\pi$ removes the radian term, and A is the required scaling for the phase correction process. Inserting the differential phase estimation from equation 30 into the carrier frequency estimation equation 32 produces equation 33.

$$\Delta f_e = \left[\frac{A}{2\pi \cdot 4T_s}\right] \sum_{k=0}^{27} w_k \cdot [-2\pi \Delta f \cdot 4T_s] = -A \cdot \Delta f \quad (33)$$

For A equal to 1 in equation 33, the carrier frequency error estimation is obtained. Since this term is the negative value of the carrier frequency error, it may be used to correct the carrier frequency.

The present invention may be used for fast carrier frequency estimation using the known synchronization (SYNC) pattern for a serial formatted QBL-MSK modulation signal. Serial formatting of the modulation waveform is selected to reduce the SYNC and frequency estimation correlation complexity. This fast carrier frequency estimation approach can be applied to standard demodulator architecture, which uses four correlators by changing the correlation structure. Besides QBL-MSK, the carrier frequency estimation approach can be applied to other quadrature modulation waveforms like Offset Quadrature Phase Shift Keying (OQPSK), Minimum Shift Keying (MSK), Gaussian MSK, Tamed Frequency Modulation (TFM), Intersymbol Jitter Free Offset Quadrature Phase Shift Keying (IJF-OQPSK), Raised Cosine Filtered Offset Quadrature Phase Shift Keying (RC-OQPSK), and bandwidth efficient Continuous Phase Modulation (CPM) schemes, for example. To simplify the SYNC and frequency estimation correlators, serial formatting of these waveforms is recommended. Also this carrier frequency estimation can be applied to Binary Phase Shift Keying (BPSK) or filtered BPSK, where serial formatting is not required to provide the reduced SYNC and frequency estimation correlation structure.

For other similar and non-similar disclosures, please refer to the following five applications filed on the same day as this application. These five applications are 11/314,123, 11/314,762, 11/313,476, 11/314,608 and 11/314,757 (and, respectively, correspond to the following five provisional applications 60/703,316; 60/703,179; 60/703,373; 60/703,320 and 60/703,095). These applications are all incorporated herein by reference in their entireties.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for determining frequency error of a serial offset quadrature pulse shaped signal, the method comprising the steps of:
   receiving, by a receiver, the serial offset quadrature pulse shaped signal having a synchronization sequence;
   detecting, by the receiver, synchronization of the quadrature pulse shaped signal;
   storing, in a memory, a baseband inphase (I) signal and a baseband quadrature (Q) signal of the synchronization sequence while detecting synchronization;
   reading, from the memory, segments of the stored baseband I and Q signals after detecting synchronization;
   correlating, by the receiver, the read segments with a spreading sequence;
   determining, by the receiver, phase differences between each of the correlated segments; and
   estimating, by the receiver, the frequency error based on the determined phase differences.

2. The method of claim 1, wherein the determining step comprises the steps of:
   developing, by the receiver, overlapping symbols from the correlated segments; and
   calculating, by the receiver, differential phase measurements between the overlapping symbols to determine the phase differences between each of the correlated segments.

3. The method of claim 2, wherein the developing step comprises:
   correlating, by the receiver, the baseband I and Q signals over a plurality of symbols with a predetermined shift between each correlation.

4. The method of claim 3, wherein the plurality of symbols is sixteen and the predetermined shift between each correlation is four symbols.

5. The method of claim 2, wherein the estimating step comprises:
   estimating, by the receiver, the frequency error based at least in part on the calculated differential phase measurements.

6. The method of claim 2, wherein the estimating step, used in the receiver, comprises solving the equation:

$$f_{est} = \frac{1}{2\pi T_{offset}} \sum_{k=0}^{N-1} w_k \Delta \theta_k$$

where $f_{est}$ is the estimated frequency error, $T_{offset}$ is the time offset between successive overlapping symbols, N is the number of overlapping symbols, $W_k$ is a weighting function, and $\Delta \theta_k$ is the phase difference between successive overlapping symbols.

7. The method of claim 2, wherein the received quadrature pulse shaped signal is received on a carrier having a carrier frequency, the overlapping symbols have a symbol rate, and the baseband I and Q signals are serially demodulated using a frequency that is one-quarter of the symbol rate below the carrier frequency.

8. The method of claim 1, further comprising the step of:
   phase rotating, by the receiver, the received quadrature pulse shaped signal to form the baseband I and Q signals.

9. The method of claim 8, further comprising the step of:
   serially demodulating the received quadrature pulse shaped signal.

10. The method of claim 9, wherein the detecting synchronization step and the correlating step of the receiver operate against the same synchronization sequence for both the baseband I signal and the baseband Q signal.

11. The method of claim 1, wherein after detecting synchronization the correlating step is started.

12. The method of claim 1, wherein the detecting synchronization step comprises the following steps implemented in the receiver:
   correlating the baseband I signal and correlating the baseband Q signal;
   squaring the correlated baseband I signal and squaring the correlated baseband Q signal;
   combining the squared baseband I signal and the squared baseband Q signal;

detecting a peak of the combined baseband I and Q signals; and comparing the detected peak to an autocorrelation function to detect synchronization.

13. The method of claim 12, wherein the combining step further comprises the step of:
determining the square root of the combined squared baseband I signal and squared baseband Q signal to develop the combined baseband I and Q signals.

14. The method of claim 1, wherein the received quadrature pulse shaped signal is modulated in the receiver using one of Quadrature Phase Shift Keying (QPSK), Offset QPSK (OQPSK), Minimum Shift Keying (MSK), Gaussian MSK, Tamed Frequency Modulation (TFM), Intersymbol Jitter Free OQPSK (IJF-OQPSK), Raised Cosine Filtered OQPSK (RC-OQPSK), or bandwidth efficient Continuous Phase Modulation (CPM) schemes.

15. A receiver comprising:
a demodulator that receives a quadrature pulse shaped signal having a synchronization sequence and that develops a baseband inphase (I) signal and a baseband quadrature (Q) signal from the received quadrature pulse shaped signal;
a phase rotator coupled to the demodulator that rotates the baseband I and Q signals;
a synchronization detection module coupled to the phase rotator that detects synchronization of the received quadrature pulse shaped signal using the rotated baseband I and Q signals;
a memory coupled to the phase rotator and the synchronization detection module, the memory storing the rotated baseband I and Q signals during synchronization detection;
a correlator coupled to the synchronization detection module and the memory, the correlator correlating segments of the rotated baseband I and Q signals read from the memory after synchronization detection; and
a frequency error correction module coupled to the correlator that estimates carrier frequency errors for the received quadrature pulse shaped signal and that develops a carrier frequency error correction signal for use in correcting the carrier frequency errors.

16. The receiver of claim 15, wherein the correlator develops overlapping symbols from the correlated segments and the frequency error correction module calculates differential phase measurements between the overlapping symbols to determine phase differences between the correlated segments to estimate the carrier frequency errors.

17. The receiver of claim 16, wherein the frequency error correction module estimates the carrier frequency errors by solving the equation:

$$f_{est} = \frac{1}{2\pi T_{offset}} \sum_{k=0}^{N-1} w_k \Delta \theta_k$$

where $f_{est}$ is the estimated frequency error, $T_{offset}$ is the time offset between successive overlapping symbols, N is the number of overlapping symbols, $w_k$ is a weighting function, and $\Delta\theta_k$ is the phase difference between successive overlapping symbols.

18. The receiver of claim 15, wherein the synchronization detection module controls the memory and the correlator such that, upon detection of synchronization, the memory stops storing the rotated baseband I and Q signals and the correlator starts correlating segments of the rotated baseband I and Q signals read from the memory.

19. The receiver of claim 15, wherein the demodulator comprises:
downconverters that down-convert the received quadrature pulse shaped signal to the baseband I and Q signals;
low pass filters coupled to the downconverters that filter the baseband I and Q signals to remove undesirable terms introduced by the downconverters;
analog-to-digital (A/D) converters coupled to the low pass filters that digitize the filtered baseband I and Q signals; and
symbol matched filters coupled to the (A/D) converters to improve signal-to-noise ratios (SNR) of the digitized baseband I and Q signals.

20. The receiver of claim 15 wherein the correlator comprises:
a plurality of segments that include a predetermined number of symbols with a predetermined delay.

21. The receiver of claim 20, wherein there are four correlator segments for each of the baseband I signal and the baseband Q signal, the predetermined number of symbols is sixteen, and the predetermined delay is four symbols.

22. The receiver of claim 15, wherein the memory includes at least one circular buffer memory.

23. The receiver of claim 15, wherein the synchronization detection module and the correlator operate against the same synchronization sequence for both the baseband I signal and the baseband Q signal.

24. The receiver of claim 15, wherein the synchronization detection module comprises:
an inphase correlator that correlates the baseband I signal;
a quadrature correlator that correlates the baseband Q signal;
an inphase squaring component coupled to the inphase correlator that squares the correlated baseband I signal and a quadrature squaring component coupled to the quadrature correlator that squares the correlated baseband Q signal;
a combiner coupled to the inphase and quadrature phase squaring comnonent that combines the squared baseband I signal and the squared baseband Q signal;
a peak detection module coupled to the combiner that detects a peak of the combined baseband I and Q signals; and
a comparator coupled to the peak detection module that compares the detected peak to an autocorrelation function to detect synchronization.

25. The receiver of claim 24, wherein the correlation detection module further comprises a square root calculator coupled between the combiner and the peak detection module, the square root calculator calculating the square root of the combined squared baseband I signal and squared baseband Q signal to develop the combined baseband I and Q signals.

26. The receiver of claim 15, wherein the received quadrature pulse shaped signal is modulated using one of Quadrature Phase Shift Keying (QPSK), Offset QPSK (OQPSK), Minimum Shift Keying (MSK), Gaussian MSK, Tamed Frequency Modulation (TFM), Intersymbol Jitter Free OQPSK (IJF-OQPSK), Raised Cosine Filtered OQPSK (RC-OQPSK), or bandwidth efficient Continuous Phase Modulation (CPM) schemes.

* * * * *